J. J. LASSEN AND J. L. GILBERT.
INSTRUMENT FOR INDICATING OR RECORDING THE FLOW OF LIQUIDS.
APPLICATION FILED FEB. 12, 1919.

1,355,764.

Patented Oct. 12, 1920.

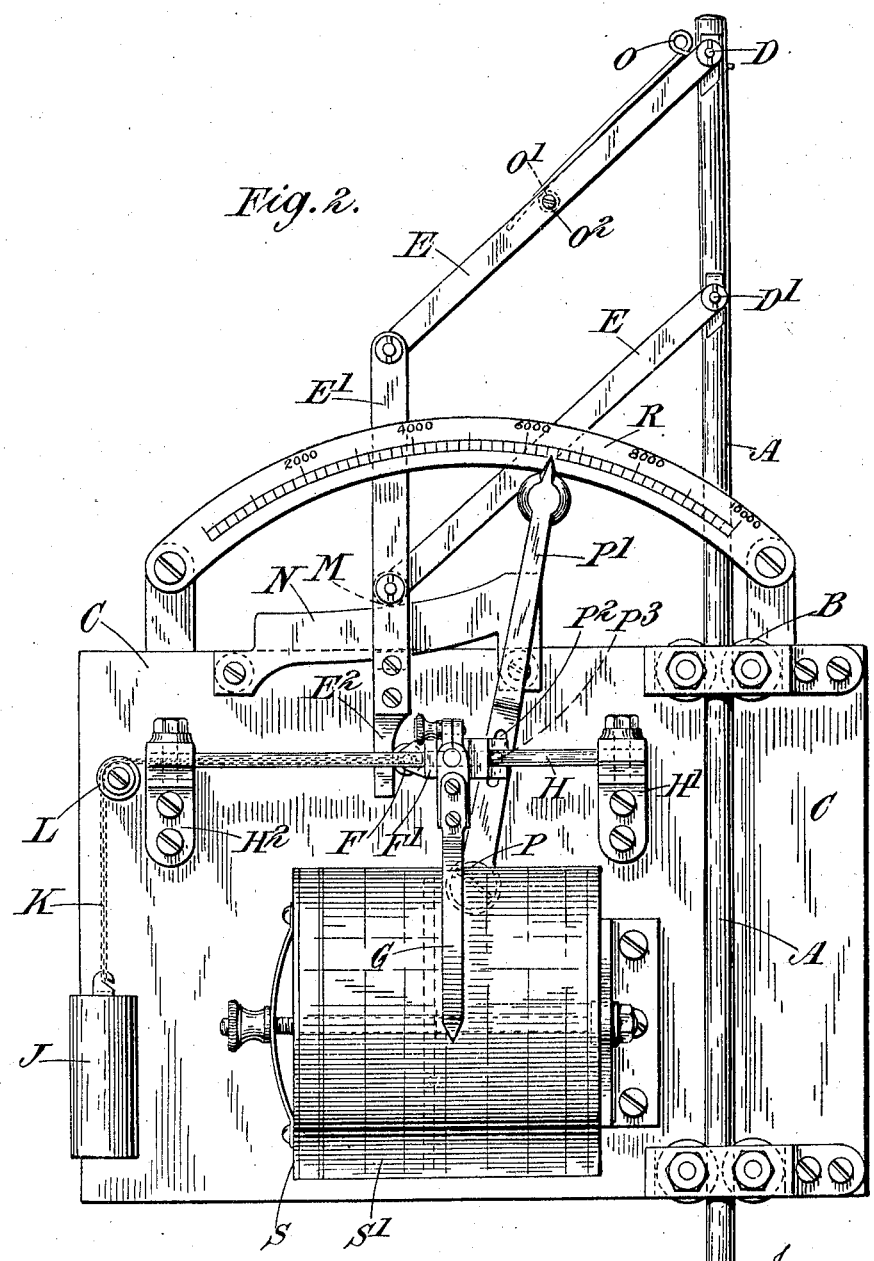

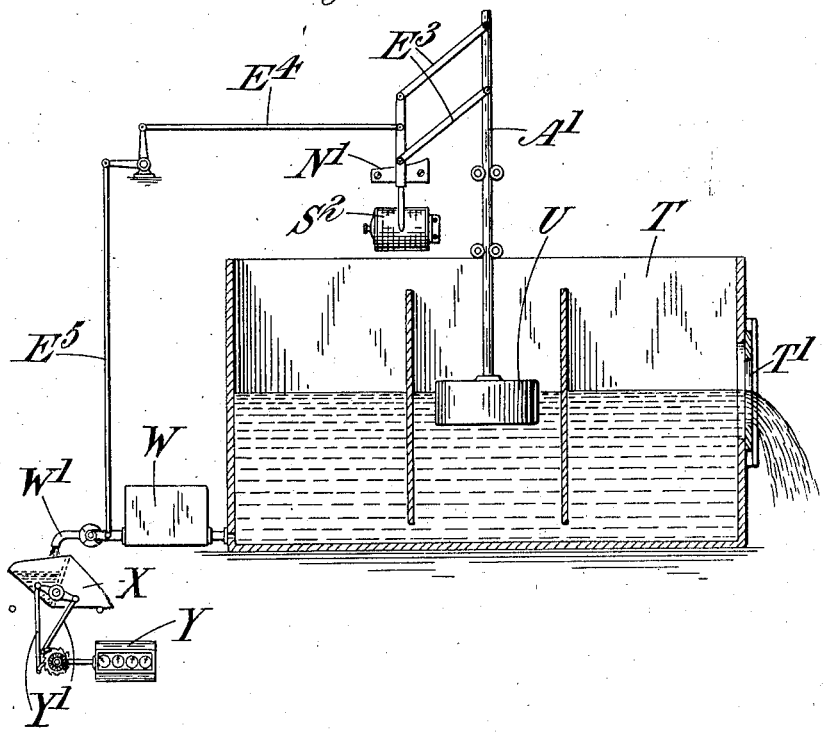

UNITED STATES PATENT OFFICE.

JENS JAKOB LASSEN, OF LONDON, AND JOHN LEWIS GILBERT, OF KEW, ENGLAND.

INSTRUMENT FOR INDICATING OR RECORDING THE FLOW OF LIQUIDS.

1,355,764.   Specification of Letters Patent.   Patented Oct. 12, 1920.

Application filed February 12, 1919. Serial No. 276,508.

*To all whom it may concern:*

Be it known that we, JENS JAKOB LASSEN, of 20–22 Lincoln's Inn Fields, London, W. C., England, and JOHN LEWIS GILBERT, of 12 Haverfield Gardens, Kew, Middlesex, England, have invented certain new and useful Improvements in Instruments for Indicating or Recording the Flow of Liquids, of which the following is a specification.

This invention relates to instruments for indicating or recording the flow of liquids and has particular reference to instruments which record on a chart the quantity of water flowing, say over a V-shaped notch. There are several forms of such instruments designed to operate according to a well-known law which expresses the quantity of liquid flowing over the notch in terms of the dimensions of the notch. These instruments are usually operated from a float and as the law connecting the rise and fall of the float with the quantity of liquid flowing is not generally a straight line law it is necessary, if the chart is to have equal spaces or divisions to employ some device which will have the effect of reproducing or translating the unequal increments of motion of the float as equal increment movements of the pen or other indicating or recording member.

In an instrument according to the present invention a fixed or stationary curved surface or guide is employed working in conjunction with a pivoted arm or lever mounted on the float rod or other member whose movements depend on the height of the liquid flowing over the notch, such pivoted arm or lever forming part of the mechanism connecting the float rod with the pen.

The shape of the curved surface will to some extent depend upon the length of the pivoted arm or lever but, supposing that length to be the same in any two instruments, then the shape of the curve will depend upon the angle of the notch through and over which the liquid flows.

In one construction of instrument according to this invention the float rod is arranged to move in suitable guides up and down in an approximately vertical line. Pivoted to the rod or preferably to a member adjustable vertically thereon are two light bars or rods forming opposite members of a parallogram or parallel motion linkage the fourth member of which is a vertical bar or rod to which the other ends of the two bars are pivoted. On this vertical bar is mounted a friction roller which engages with the curved surface of the fixed guide or constraining member.

The lower part of the vertical bar operates the carriage on which the pen or other indicating or recording device is mounted such carriage sliding freely on horizontal guides and being fitted with a friction roller kept in contact with the vertical bar by means of a cord and counterweight.

Beneath the point of the pen is a drum rotated say by clockwork and adapted to carry the chart in the usual manner.

Although the fixed curved guide is primarily intended to enable a chart with equal divisions to be used yet it is to be understood that in cases where it is desired that a certain portion of the scale should be more "open" than the other portions the shape of the curved surface may be modified to attain this end.

The improved instrument can be used for a variety of purposes for instance for measuring and recording in connection with water supply systems, boiler feed water, sewage or other effluents and for any other purpose where it is necessary to indicate or record the flow of a liquid.

If it is desired to employ the instrument as an integrating meter to register the total amount of liquid passing say out of a main tank then the translated movement of the float may be caused to operate a valve controlling the admission of the liquid to a measuring device such for instance as a tipping bucket which operates some form of counting mechanism. In the accompanying drawings, Figure 1 is a perspective view of one construction of instrument according to this invention.

Fig. 2 is a front elevation of a portion of the mechanism, and

Fig. 3 is a diagram showing an arrangement of apparatus in which the instrument acts as an integrating meter.

Figure 1:
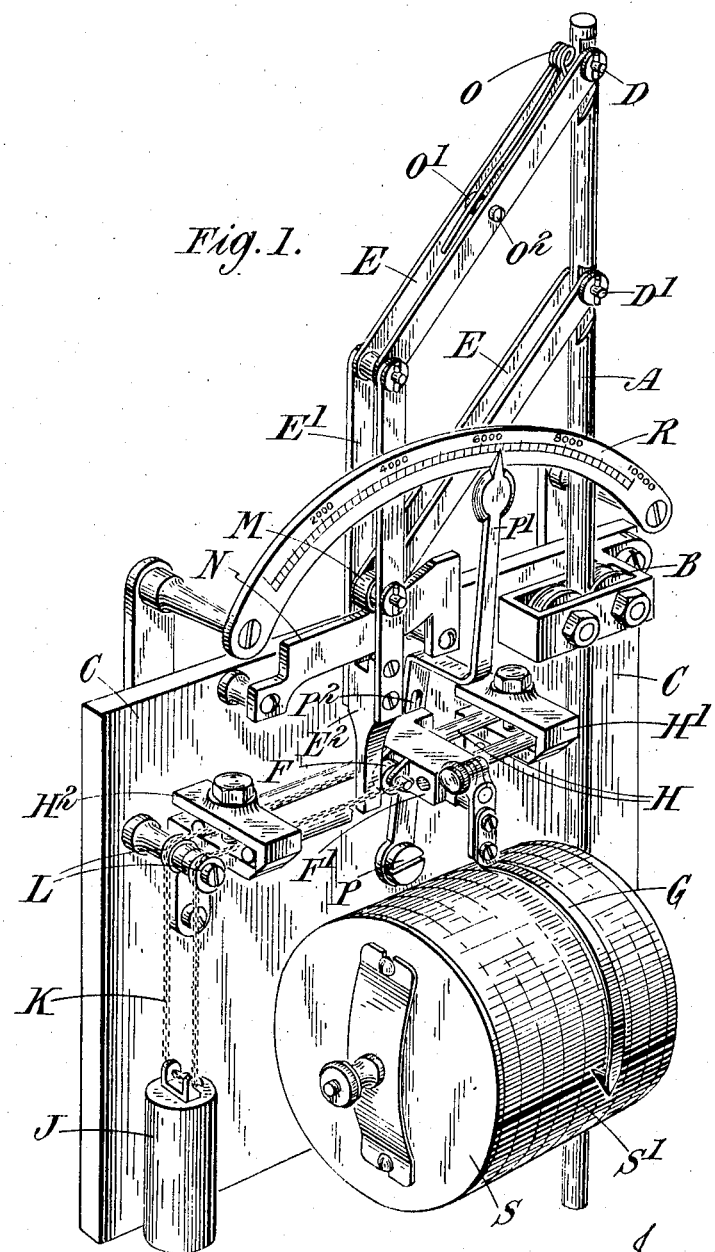

With reference first to Figs. 1 and 2, A is a rod attached to a float in the liquid flow of which is to be measured. The float is not shown in the drawings but it will be understood that it may be at the lower end of the rod which can be of any desired length. The float rod A passes between guide rollers two of which are indicated at B supported on the backboard or frame C of the instrument. Pivoted to the float rod A at D and D' is a parallel motion linkage E E' the member E' of which is prolonged as at $E^2$ to coöperate with a friction roller F on a carriage F' to which a recording pen G is attached. The carriage F' is capable of sliding freely on rods or rails H supported in brackets H' $H^2$ on the backboard C. A weight J is suspended on chains K which pass over small anti-friction pulleys L and are attached to the carriage F', so as to keep the anti-friction roller F in coöperative engagement with the member $E^2$.

The member E' of the parallel motion linkage is furnished with a friction roller M and this is kept in contact with a curved guide N fixed to the backboard C. A spring O acting on a roller O' on a pin $O^2$ keeps the friction roller M in contact with the curved guide N.

Pivoted at P to the backboard C is an indicating arm or lever P' working in conjunction with a fixed scale R. This arm P' is slotted as at $P^2$ and this slot accommodates a pin $P^3$ attached to the carriage F'.

The recording pen G works in conjunction with a drum S driven by clockwork or other well known mechanism and adapted to carry a removable chart S'.

Supposing the float to which the rod A is attached rises and falls according to the height of liquid flowing over a V-shaped notch then as is well known, the law connecting the rise and fall of the float with the quantity of liquid flowing will not be a straight line law, that is to say, for equal increments in the rate of flow of the liquid there will be unequal increments of vertical motion of the float rod. In order that the distances on the chart S' indicating the flow of the liquid may be equal the fixed curved guide N is employed the curvature of the guide surface being calculated to suit the construction of the instrument and the circumstances in which it is employed.

Obviously this control or regulation of the recording pen G also affects the indicator or pointer P' and the divisions on the scale R can consequently be equal which would not be the case were the fixed guide N not properly curved.

An instrument according to this invention need not necessarily have both recording and indicating mechanism as shown in the drawings, neither need the details of construction be as illustrated. Further, although primarily the object of the curved guiding surface N is to give a straight line law on the chart or the scale yet obviously the shape of the curved surface may be modified to introduce any desired variation in the chart or the scale.

With reference now to Fig. 3 which is purely diagrammatic T is a main tank having a V-notch T' through which the liquid passes out. In this tank is a float U having a rod A' connected by a linkage $E^3$ to a pen or other recording device operating in conjunction with a drum $S^2$ the motion of the float being translated by means of the fixed curved guide N'. This part of the mechanism is not shown or described in detail as it may be exactly similar to that already described with reference to Figs. 1 and 2. A small tank W is in constant communication with the main tank T and is kept filled with the liquid. This tank W has an outlet W' controlled by a valve which is operated from the linkage $E^3$ by means of the rods $E^4$ and $E^5$. Thus the extent of opening of the valve will depend upon the position of the float U and will be proportional to the amount of liquid passing over the V-notch T'. The liquid passing out at the outlet W' enters some well known measuring device such as the tipping bucket X and each time this bucket oscillates it operates counting mechanism Y through rods Y'. Thus in the arrangement illustrated diagrammatically in Fig. 3 the position of the pen on the drum will indicate the rate of flow of the liquid and the indication on the counting apparatus Y will give the total amount of liquid which, in a given time has passed out of the main tank T.

It will be understood that various changes may be made in the construction and arrangement of parts of the invention which is, therefore, not limited to the exact form shown and described, the scope of the invention being indicated in the following claims. It will be also understood that the indicating device mentioned in the claims may be either an indicator or a recorder, or an instrument for both indicating and recording.

What we claim as our invention and desire to secure by Letters Patent is:—

1. In an instrument for indicating the flow of a liquid the combination of a float, indicating mechanism operated thereby, means for translating unequal increments of motion of the float into equal increments of motion of the indicating mechanism, measuring apparatus for the liquid, counting mechanism operated by such measuring apparatus, a valve admitting liquid to the measuring apparatus and mechanism operated by the indicating mechanism to control the valve.

2. In an instrument for indicating the flow of a liquid the combination of a float, indicating mechanism operated thereby, a fixed curved surface coöperating with the indicating mechanism so that unequal increments of motion of the float are translated into equal increments of motion of the indicating mechanism, measuring apparatus for the liquid, counting mechanism operated by such measuring apparatus, a valve admitting liquid to the measuring apparatus and mechanism operated by the indicating mechanism to control the valve.

3. In an instrument for indicating the flow of a liquid the combination of a main tank for the liquid having a V-notch through which the liquid passes out of the tank, a float in said tank, indicating mechanism operated by the float, a fixed curved surface coöperating with the indicating mechanism so that unequal increments of motion of the float are translated into equal increments of motion of the indicating mechanism, an auxiliary tank kept full of liquid from the main tank and said auxiliary tank having an outlet, a valve controlling said outlet, mechanism operated by the indicating mechanism to control said valve, measuring apparatus in communication with said outlet, counting mechanism, and means operated by the measuring apparatus for operating the counting mechanism substantially as set forth.

In testimony whereof we have signed our names to this specification.

JENS JAKOB LASSEN.
JOHN LEWIS GILBERT.